(12) United States Patent
Giorgetti et al.

(10) Patent No.: US 9,982,641 B2
(45) Date of Patent: May 29, 2018

(54) VALVE ASSEMBLY WITH A PARTICLE RETAINER ELEMENT AND FLUID INJECTION VALVE

(71) Applicant: Continental Automotive GmbH, Hannover (DE)

(72) Inventors: Edoardo Giorgetti, Rosignano Marittimo (IT); Lucca Matteucci, Pisa (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days. days.

(21) Appl. No.: 15/089,949

(22) Filed: Apr. 4, 2016

(65) Prior Publication Data

US 2016/0290295 A1    Oct. 6, 2016

(30) Foreign Application Priority Data

Apr. 2, 2015    (EP) .................................... 15162310

(51) Int. Cl.
*F16K 1/12*    (2006.01)
*F02M 51/06*    (2006.01)
(Continued)

(52) U.S. Cl.
CPC ...... *F02M 51/0671* (2013.01); *F02M 51/061* (2013.01); *F02M 61/165* (2013.01);
(Continued)

(58) Field of Classification Search
CPC ........ F16K 31/06; F16K 31/0662; F16K 1/12; F02M 61/165; F02M 51/06; F02M 51/0671; F02M 2200/27
(Continued)

(56) References Cited

U.S. PATENT DOCUMENTS 5,335,863 A * 8/1994 DeGrace ............ F02M 51/0671
239/575
5,423,489 A * 6/1995 Wood ................. F02M 51/0671
239/575
(Continued)

FOREIGN PATENT DOCUMENTS

EP    697064 B1    11/1997    ............. F02M 37/22
EP    1118767 A2    7/2001    ............. F02M 61/12
(Continued)

OTHER PUBLICATIONS

European Search Report, Application No. 151623010.5, 5 pages, dated Jun. 25, 2015.
(Continued)

*Primary Examiner* — Arthur O Hall
*Assistant Examiner* — Joseph A Greenlund
(74) *Attorney, Agent, or Firm* — Slayden Grubert Beard PLLC

(57) ABSTRACT

A valve assembly for a fluid injection valve may comprise a valve body, a valve needle moving in a cavity of the valve body, an armature in the cavity for actuating the valve needle, and a particle retainer. The cavity may extend axially through the valve body to connect a fluid inlet end to a fluid outlet end of the valve body and have a valve seat adjacent to the fluid outlet end. The first portion of the cavity may limit movement of the armature in the axial direction towards the fluid outlet end by a bottom surface having a central opening from which a second portion of the cavity extends towards the fluid outlet end. The shaft of the valve needle may extend through the opening into the second portion. The particle retainer element may bear on the bottom surface, circumferentially surrounding the shaft of the valve needle and overlapping the opening.

14 Claims, 10 Drawing Sheets

(51) Int. Cl.
*F02M 61/16* (2006.01)
*F16K 31/06* (2006.01)

(52) U.S. Cl.
CPC ............ *F16K 1/12* (2013.01); *F16K 31/0662* (2013.01); *F02M 2200/27* (2013.01); *F16K 31/06* (2013.01)

(58) Field of Classification Search
USPC ........... 239/585.5, 575, 533.11, 533.12, 590, 239/590.3, 590.5; 137/544–550
See application file for complete search history.

(56) References Cited

U.S. PATENT DOCUMENTS

| | | | | |
|---|---|---|---|---|
| 5,516,424 A * | 5/1996 | Strohschein | ........... | B01D 29/23 137/544 |
| 5,678,767 A * | 10/1997 | Rahbar | .............. | F02M 51/0671 239/533.2 |
| 5,755,386 A * | 5/1998 | Lavan | .................. | F02M 51/061 239/585.1 |
| 5,967,424 A * | 10/1999 | Bonnah, II | ......... | F02M 51/0667 239/575 |
| 6,003,791 A * | 12/1999 | Reiter | ................ | F02M 51/0671 239/575 |
| 6,015,103 A * | 1/2000 | Kotkowicz | ........ | F02M 51/0671 239/533.11 |
| 6,039,271 A * | 3/2000 | Reiter | ................ | F02M 51/0653 239/533.11 |
| 6,405,947 B2 * | 6/2002 | Fochtman | .......... | F02M 51/0671 239/585.4 |
| 6,520,434 B1 * | 2/2003 | Reiter | ................ | F02M 51/0685 239/533.11 |
| 6,572,028 B1 * | 6/2003 | Fly | ......................... | F02M 61/12 239/5 |
| 6,575,428 B1 * | 6/2003 | Stier | .................... | F02M 51/061 239/585.1 |
| 6,604,695 B1 * | 8/2003 | Parish | ................ | F02M 51/0614 239/533.11 |
| 6,764,031 B2 * | 7/2004 | Sebastian | ........... | F02M 51/0671 239/494 |
| 6,786,433 B2 * | 9/2004 | Maier | ................ | F02M 51/0671 239/533.3 |
| 6,789,752 B2 * | 9/2004 | Dantes | ............... | F02M 51/0671 239/491 |
| 6,796,511 B2 * | 9/2004 | Hohl | .................... | F02M 45/083 239/5 |
| 6,994,281 B2 * | 2/2006 | Reiter | ................ | F02M 51/0685 239/533.2 |
| 7,252,245 B2 * | 8/2007 | Nishiwaki | .......... | F02M 51/0685 239/585.1 |
| 7,540,435 B2 * | 6/2009 | Mueller | ............. | F02M 51/0671 239/575 |
| 7,617,991 B2 * | 11/2009 | Wells | ................... | F02M 61/165 137/544 |
| 7,770,812 B2 * | 8/2010 | Sebastian | ........... | F02M 51/0667 210/429 |
| 7,775,463 B2 * | 8/2010 | Abe | .................... | F02M 51/0614 239/5 |
| 9,546,627 B2 * | 1/2017 | Okamoto | ........... | F02M 51/0671 |
| 9,605,638 B2 * | 3/2017 | Falaschi | ............. | F02M 61/165 |
| 2003/0132322 A1 * | 7/2003 | Dantes | ................ | F02M 45/086 239/585.1 |
| 2004/0026541 A1 * | 2/2004 | Sebastian | ........... | F02M 51/0625 239/585.5 |
| 2004/0226541 A1 * | 11/2004 | Crary | ................. | F02M 37/0023 123/460 |
| 2007/0187532 A1 * | 8/2007 | Hornby | .............. | F02M 51/005 239/585.4 |
| 2009/0121049 A1 * | 5/2009 | Flynn | ..................... | F02M 61/12 239/575 |
| 2009/0236448 A1 * | 9/2009 | Burkhard | ........... | F02M 61/165 239/575 |
| 2009/0256009 A1 * | 10/2009 | Perry | ..................... | F02M 61/12 239/575 |
| 2010/0012754 A1 * | 1/2010 | Hayatani | ............ | F02M 51/0671 239/585.5 |
| 2011/0006136 A1 * | 1/2011 | Flynn | ..................... | F02M 61/12 239/575 |
| 2013/0214066 A1 * | 8/2013 | Suzuki | ............... | F02M 51/0685 239/585.5 |
| 2014/0124603 A1 * | 5/2014 | Suzaka | ............... | F02M 51/0625 239/585.4 |
| 2015/0102135 A1 * | 4/2015 | Romeo | .............. | F02M 51/0685 239/585.4 |
| 2015/0354516 A1 * | 12/2015 | Izzo | .................... | F02M 51/0614 123/445 |
| 2016/0327001 A1 * | 11/2016 | Izzo | ..................... | F02M 61/165 |

FOREIGN PATENT DOCUMENTS

| | | | | |
|---|---|---|---|---|
| EP | 2060777 | A1 | 5/2009 | ............ F02M 61/12 |
| JP | 3944497 | B2 | 7/2007 | ............ F02M 51/06 |
| JP | 2015025406 | A | 2/2015 | ............ F02M 51/06 |

OTHER PUBLICATIONS

Korean Office Action, Application No. 2018016931274, 12 pages, dated Mar. 9, 2018.

\* cited by examiner

VALVE ASSEMBLY WITH A PARTICLE RETAINER ELEMENT AND FLUID INJECTION VALVE

CROSS-REFERENCE TO RELATED APPLICATIONS

This application claims priority to EP Application No. 15162310 filed Apr. 2, 2015, the contents of which are hereby incorporated by reference in their entirety.

TECHNICAL FIELD

The present disclosure relates to a valve assembly for a fluid injection valve, and in particular to a valve assembly comprising a particle retainer element.

BACKGROUND

Fluid injection valves are used, for example as part of fuel injectors in order to inject fuel into combustion chambers of internal combustion engines. Fuel leakage from such fluid injection valves into the internal combustion engine can be detrimental for the combustion process or may even damage the combustion engine. Such leakage can occur due to contaminants which are flowing through the injection valve to the sealing surfaces where they may prevent a fluid tight closing of the injection valve.

For example, from EP 0 697 064 A1 it is known to dispose a filter cartridge adjacent to a fuel inlet end of a fuel injector.

EP 2 060 777 A1 discloses an internal lower filter for a fuel injector which includes a self-supporting guide guiding a reciprocally activated valve of an internal valve assembly of a fuel injector.

SUMMARY OF THE INVENTION

A valve assembly for a fluid injection valve may embody various teachings of the present disclosure. A fluid injection valve which comprises the valve assembly may also embody various teachings of the present disclosure.

The valve assembly comprises a valve body which has a longitudinal axis. The valve body has a cavity which extends axially through the valve body for hydraulically connecting a fluid inlet end of the valve body to a fluid outlet end of the valve body. Further, the valve body has a valve seat adjacent to the fluid outlet end.

In some embodiments, the valve body is assembled from a plurality of parts and comprises a main body and a seat body, the seat body comprising the valve seat. The seat body is in particular positioned adjacent to the fluid outlet end and may preferably close the cavity at the fluid outlet end, with the exception of one or more injection holes downstream of the valve seat which perforate the seat body. In a preferred embodiment, the seat body of the valve body is a one-pieced part.

The valve assembly further comprises a valve needle. The valve needle is movably received in the cavity. In particular, it is axially displaceable in reciprocating fashion relative to the valve body. The valve needle is operable to sealingly contact the valve seat in a closing position of the valve needle.

In addition, the valve assembly comprises an armature. The armature is in particular a part of an electromagnetic actuator assembly of the fluid injection valve. The armature is configured and movably arranged in the cavity for displacing the valve needle axially away from the closing position.

In particular, the electromagnetic actuator assembly comprises a pole piece which is positionally fixed relative to the valve body. It may be in one piece with the valve body or it may be positioned in the cavity. The electromagnetic actuator assembly may further expediently comprise a coil for generating a magnetic field to attract the armature towards the pole piece. Preferably, when the coil is energized, the armature travels towards the pole piece and takes the valve needle with it to displace the valve needle axially, away from the closing position. In one embodiment, the valve needle comprises an armature retainer element and the armature is operable to engage into a form-fit connection with the armature retainer element for axially moving the valve needle.

The cavity of the valve body has a first portion and a second portion. The first portion accommodates the armature and is limited in axial direction towards the fluid outlet end by a bottom surface. The bottom surface has a central opening from which the second portion of the cavity extends towards the fluid outlet end. In one embodiment, the first portion and/or the second portion have a generally cylindrical shape. The bottom surface preferably extends in radial direction at an interface of the first and second portions, so as to shape a step in the cavity.

The valve needle has a shaft which extends through the opening into the second portion. In particular, the shaft extends, in axial direction from the fluid inlet end towards the fluid outlet end, from the armature retainer element through the armature, further through the first portion of the cavity and through the opening into the second portion of the cavity, in particular to a sealing element of the valve needle.

The sealing element may be fixed to the shaft at a downstream end thereof and is in sealing mechanical contact with the valve seat when the valve needle is in the closing position. The sealing element is for example a ball which is attached to the downstream end of the shaft of the valve needle. The sealing element is in mechanical contact with the valve seat when the valve needle is in the closing position. In some embodiments, the sealing element is in sliding mechanical contact with the seat body for axially guiding the valve needle.

Additionally, the valve assembly comprises a particle retainer element. The particle retainer element is positioned in the cavity in such fashion that it bears on the bottom surface of the first portion. The particle retainer element circumferentially surrounds the shaft of the valve needle. Further, the particle retainer element overlaps with the opening, in particular in top view along the longitudinal axis.

By means of the particle retainer element, particles such as contaminants coming from a fluid tank or from the fluid feeding system as well as particles released by the fluid injection valve itself—such as burrs from components of the fluid injection valve—can be filtered. In some embodiments, the filter is positioned downstream of most movable parts of the valve assembly, in particular it is located downstream of the armature. In this way, the risk for particles being released from the valve assembly downstream of the particle retainer element is particularly small. At the same time, the particle filter does not require lateral space around the valve needle adjacent to the fluid outlet end. In particular, the sealing element of the valve needle may be guided by direct mechanical contact with the—preferably one-pieced—seat element of the valve body in this way. Thus, the valve body may have particularly small lateral dimensions at its fluid outlet end. In addition, tolerances of the lateral position of the valve needle relative to the valve seat may be particularly small. In addition, manufacturing of the particle retainer element and assembling of the particle retainer element into the fluid injection valve may be particularly simple and/or cost-efficient.

In some embodiments, the valve assembly comprises fluid channels which are operable to guide fluid towards an outer edge region of the bottom surface. For example, the fluid channels are comprised by the armature. They may extend obliquely with respect to the longitudinal axis. In other words, the radial distance of the fluid channels from the longitudinal axis increases in axial direction towards the fluid outlet end. In some embodiments, the fluid channels are formed between an outer circumferential surface of the armature and the valve body.

By means of the fluid channels, fluid may be directed to flow radially inward along the bottom surface of the first portion of the cavity before entering the second portion through the opening in the bottom surface. In this way, a particularly high probability for retaining particles in the fluid flow by means of the particle retainer element is achievable.

In some embodiments, the particle retainer element has a flange portion which bears on the bottom surface. In this way, a particularly precise and reproducible axial position of the particle retainer element relative to the bottom surface is achievable.

In some embodiments, the particle retainer element has a circumferential inner edge which is radially offset with respect to an outer contour of the opening of the bottom surface in radial inward direction. In other words, the circumferential inner edge is positioned within the opening in top view along the longitudinal axis and preferably spaced apart from the outer contour of the opening. The particle retainer element may partially cover the opening in this way.

In some embodiments, the circumferential inner edge defines a central aperture of the particle retainer element. In particular, the particle retainer element is generally ring-shaped in top view along the longitudinal axis. The shaft of the valve needle may extend axially through the aperture. In this way, the particle retainer element can be simply integrated in conventional valve designs.

In some embodiments, the particle retainer element comprises a trench portion for accommodating particles. In these embodiments, the trench portion has a U-shaped cross section in the shape of a body of rotation resulting from rotating the U-shape around the longitudinal axis. The U-shape is preferably open in axial direction towards the fluid inlet end. The trench portion may follow the flange portion in radial inward direction. For example, it is positioned between the flange portion and the circumferential inner edge in radial direction. In some embodiments, the trench portion extends axially into the second portion of the cavity. By means of the trench portion, particles which are retained by the particle retainer element can be stored particularly safely in the particle retainer element. The risk that the particles are released from the retainer element and reach the valve seat is particularly small.

In some embodiments, an upstream surface of the particle retainer element extends, in the course from the flange portion to the circumferential inner edge, in radial inward direction, subsequently in axial direction towards the fluid inlet end, and subsequently in radial outward direction. For example, the upstream surface of the particle retainer element has a generally U-shaped cross sectional area, the U-shape being open in radial outward direction, with the symmetry axis of the U-shape being perpendicular to the longitudinal axis of the valve body. The upstream surface may be positioned within the first portion of the cavity, without extending into the second portion. In this way, a secure containment of the particles and/or a small size of the particle retainer element and/or small dimensions of the valve body in the region of the second portion of the cavity are achievable. In other words, by means of the upstream surface, a circumferential pocket for accommodating particles is formed by the particle retainer element.

In some embodiments, the circumferential inner edge of the particle retainer element is positioned in the first portion of the cavity. It is preferably axially offset towards the fluid inlet end relative to the bottom surface of the first portion, and in particular also relative to the flange portion of the particle retainer element. In this way, the risk is particularly small that particles, which are contained in the fluid flow that flows radially inward along the bottom surface, pass the circumferential inner edge and flow through the aperture of the particle retainer element to the fluid outlet end of the valve body.

In some embodiments, the cross sectional area of the aperture is larger than the maximum cross sectional area of that portion of the valve needle which is positioned downstream of the circumferential inner edge. In other words, the aperture is dimensioned such that the valve needle, during manufacturing of the valve assembly, can be shifted into the valve body into the closing position with the particle retainer element already installed in the valve body. The cross sectional area of the aperture may be larger than the cross sectional area of the sealing element of the valve needle. Assembling the valve assembly may be particularly simple in this way.

In some embodiments, the circumferential inner edge is in mechanical contact with the shaft of the valve needle. In some embodiments, the valve needle comprises a disc element and the circumferential inner edge is in mechanical contact with the disc element. In this way, the risk that particles pass through the aperture is particularly small.

The disc element may extend circumferentially around the shaft and is particularly rigidly fixed to the shaft. The disc element may be operable to limit axial displaceability of the armature relative to the valve needle in direction towards the fluid outlet end.

In some embodiments, the particle retainer element, in particular the circumferential inner edge, is in a form-fit connection with the valve needle or is operable to engage in a form-fit connection with the valve needle for limiting axial displacement of the circumferential inner edge relative to the shaft. In some embodiments, the particle retainer element is rigidly fixed to the valve needle. In some embodiments, the particle retainer element is mechanically connected to the valve needle in such fashion that it has an axial play with respect to the valve needle. The play may be dimensioned such that it is larger than the needle lift which the valve needle travels from the closing position to a fully open position during operation of the valve assembly.

In this way, the valve needle and the particle retainer element can be preassembled and inserted together into the valve body during manufacturing of the valve assembly. In addition, there is no need to move or deform the particle retainer element for displacing the valve needle away from the closing position for opening the valve or towards the closing position for closing the valve during operation of the valve assembly.

In some embodiments, the valve assembly further comprises an armature spring. The armature spring may be seated against the armature and against the particle retainer element at opposite axial ends. It is preloaded to press the particle retainer element in contact with the bottom surface. It also may be operable to bias the armature in contact with the retainer element of the valve needle by means of the preload. The particle retainer element can be easily fixed relative to the valve body in this way. In some embodiments, the particle retainer element is press-fitted into the valve body and/or a valve connection is established with the valve body for positionally fixing the particle retainer element relative to the valve body.

In some embodiments, the particle retainer element is a metal part. In some embodiments, it is a one-pieced metal part. In this way, the particle retainer element is particularly robust. For example, it may be a turned or stamped metal part. In some embodiments, it is made from stainless steel.

It is conceivable that the particle retainer element is solid, and unperforated by filtering holes. In some embodiments, the upstream surface of the particle retainer element is a simply connected topological space. Thus, the particle retainer element forces fluid to flow from the first portion of the cavity through the aperture into the second portion of the cavity. In some embodiments, the particle retainer element has a trench portion and/or a pocket as described above and is particularly preferably shaped to generate turbulences in the fluid flow to deposit particles from the fluid flow in the trench portion or pocket, for example by means of the circumferential inner edge being axially offset towards the fluid inlet portion relative to the flange portion.

In some embodiments, the particle retainer element has a multitude of filtering holes which form a filter sieve. The filtering holes may expediently penetrate the upstream surface of the particle retainer element and perforate the particle retainer element, in particular to a downstream surface thereof. The filtering holes may have a diameter of 100 µm or less, particularly preferably of 50 µm or less, for example between 20 µm and 30 µm, the limits being included. In this way, efficient filtering introduces few disturbances to the fluid flow.

In some embodiments, the fluid injection valve comprises an additional fluid filter upstream of the armature. For example, the additional fluid filter can be positioned at or at least adjacent to the fluid inlet end of the valve body. In some embodiments, the valve assembly comprises a return spring for biasing the valve needle towards the closing position, the return spring being seated against the valve needle at one axial end and being seated against the additional fluid filter at the opposite axial end. In some embodiments, the fluid filter is press-fitted into the pole piece. In this way, particles coming from the fluid tank or from a fluid feed line can already be filtered by means of the additional fluid filter before reaching the valve needle and the armature. The particle retainer element only needs to remove particles from the fluid which are released below the additional fluid filter. Therefore, by means of using the particle retainer element and the additional fluid filter, the risk for particles reaching the valve seat is particularly small.

BRIEF DESCRIPTION OF THE DRAWINGS

Further advantages, advantageous embodiments and developments of the valve assembly and the fluid injection valve will become apparent from the following exemplary embodiments which are described in the following in connection with schematic figures.

In the figures.

DETAILED DESCRIPTION

Figure 1A:
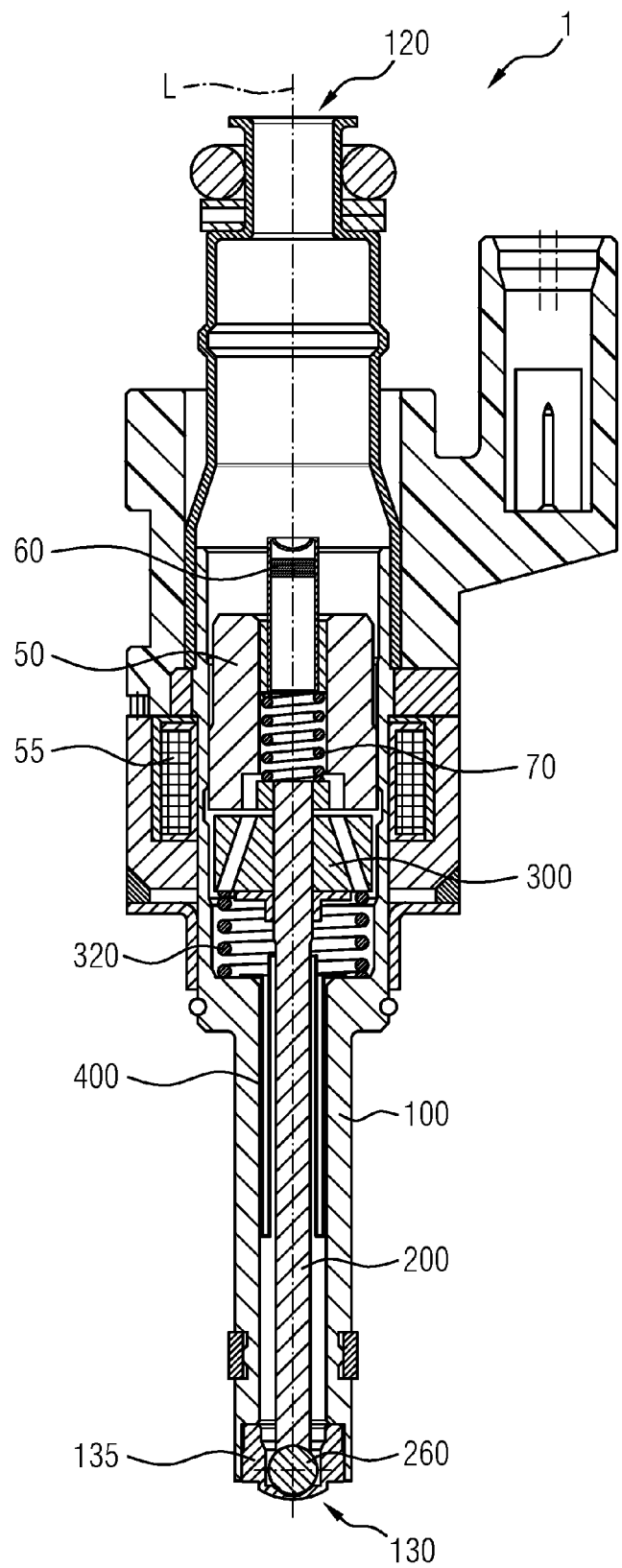
FIG. 1A shows a longitudinal section view of a fluid injection valve according to teachings of the present disclosure.

In the exemplary embodiments and in the figures, identical, similar or similarly acting elements are provided with the same reference symbols. The figures and individual elements in the figures are not to be regarded as true to scale, rather individual elements may be exaggerated in size for better representability or understanding. In addition, in the schematic longitudinal section views of FIG. 1B and FIGS. 2 to 14, lines which indicate edges that are positioned behind the drawing plane in viewing direction are largely omitted to improve the readability of the figures. In addition, in some figures individual reference symbols may be omitted to improve the clarity of the figures. Specifically, in FIGS. 2 through 14, most reference symbols which would correspond to those indicated in FIG. 1B have been omitted.

Figure 1B:
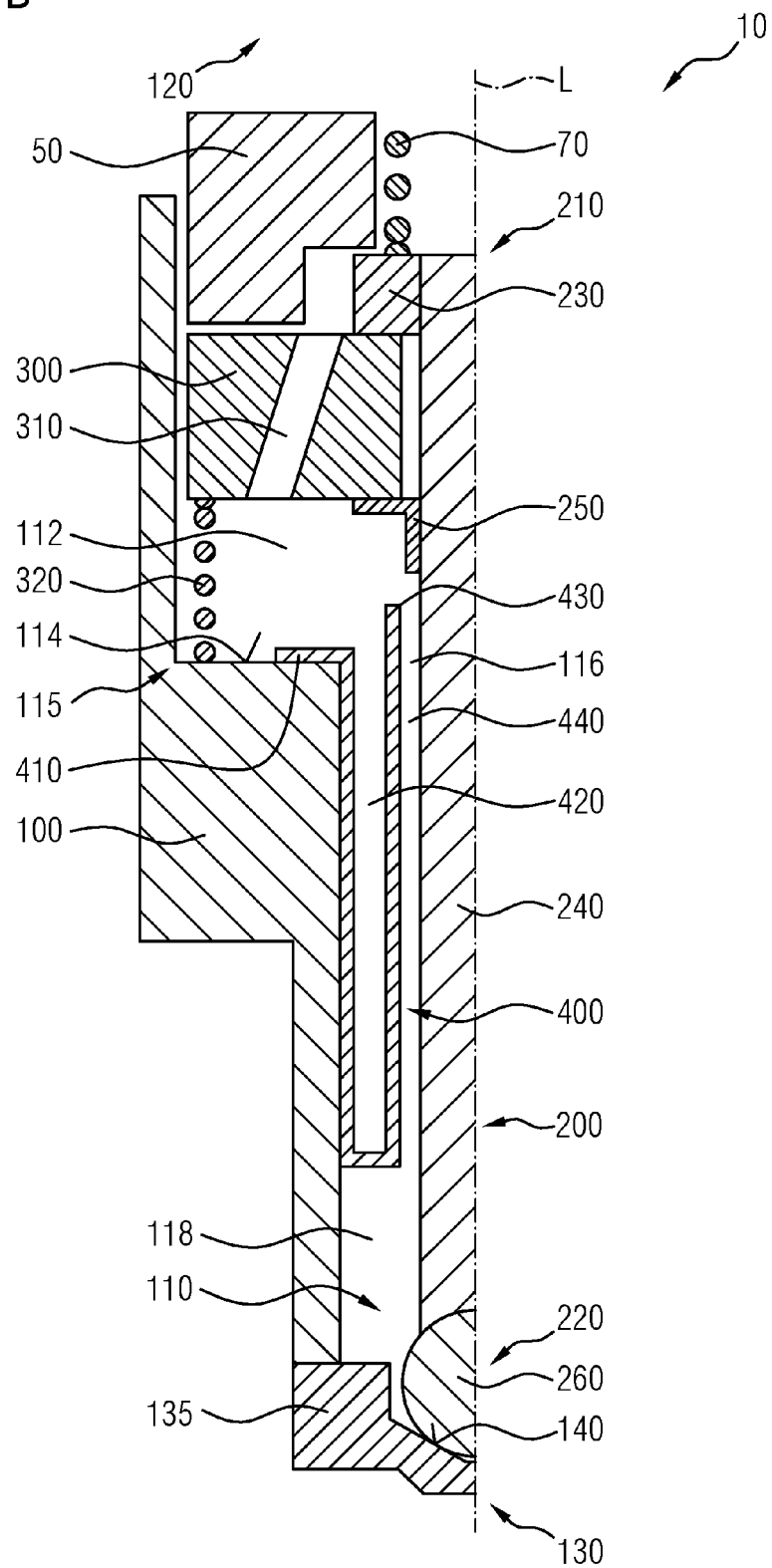
FIG. 1B shows a schematic longitudinal section view of a portion of a valve assembly of the fluid injection valve according to teachings of the present disclosure.

FIG. 1A shows a longitudinal section view of a fluid injection valve 1 according to teachings of the present disclosure. The fluid injection valve 1 comprises a valve assembly 10. FIG. 1B shows a schematic longitudinal section view of the valve assembly 10 of the fluid injection valve 1 according to teachings of the present disclosure.

The valve assembly 10 has a valve body 100 which extends along a longitudinal axis L from a fluid inlet end 120 to a fluid outlet end 130. The valve body 10 is in the present embodiment assembled from a plurality of parts. For example, it comprises a fluid inlet tube adjacent to the fluid inlet end 120, a main body, and a one-pieced seat body 135 which is inserted into the main body and fixed thereto at the fluid outlet end 130.

As shown in FIGS. 1A and 1B, the fluid injection valve 1 is a fuel injection valve configured for injecting fuel—such as gasoline—directly into a combustion chamber of an internal combustion engine.

The valve body 100 has a cavity 110 which extends axially through the valve body 100 for hydraulically connecting the fluid inlet end 120 to the fluid outlet end 130 of the valve body. The valve body 100 has a valve seat 140 which is positioned adjacent to the fluid outlet end 130 and, in the embodiment shown, is comprised by the seat body 135.

A valve needle 200 is received in the cavity 110 so that it is movable relative to the valve body 100 in reciprocating fashion. It is operable to prevent dispensing of fluid from the cavity 110 through an injection nozzle or a plurality of injection nozzles in the seat body 135 by sealingly contacting the valve seat 140 in the closing position of the valve needle 200. The valve assembly 10 comprises a calibration spring 70, which is arranged in the cavity 110 and preloaded for axially biasing the valve needle 200 towards the closing position.

Further, the fluid injection valve 1 has an electromagnetic actuator assembly which comprises an armature 300, a pole piece 50 and a coil 55. The pole piece 50 and the armature 300 are positioned in the cavity 110 of the valve body 100. The pole piece 50 is positionally fixed relative to the valve body 100 (e.g., is press-fitted into the valve body 100). The armature 300 is movable relative to the pole piece and, thus, relative to the valve body 100 along the longitudinal axis in reciprocating fashion. The coil 55 extends circumferentially around a portion of the valve body 100 and is operable to generate a magnetic field for attracting the armature 300 in axial direction towards the pole piece 50.

The armature 300 is mechanically coupled to the valve needle 200 for displacing the valve needle 200 axially away from the closing position. The valve needle 200 has a sealing element 260 at a downstream end 220 of the valve needle 200. Adjacent to an upstream end 210 of the valve needle, the valve needle 200 comprises an armature retainer element, briefly denoted as retainer element 230 in the following. A shaft 240 extends from the retainer element 230 to the sealing element 260. The retainer element 230 and the sealing element 260 are fixed to the shaft 240, for example by a welded connection. It is also conceivable that retainer element 230 and/or the sealing element 260 is/are in one piece with the shaft 240 instead of being fixed thereto. In the present embodiment, the sealing element 260 is in the shape of a ball and protrudes radially beyond the shaft 240, at least in the region of the downstream end 220.

The armature extends circumferentially around a portion of the shaft 240 and is axially displaceable relative to the valve needle 200. Axial displaceability of the armature 300 relative to the valve needle 200 is limited in direction towards the upstream end 210 of the valve needle 200 by the retainer element 230 and in direction towards the downstream end 220 of the valve needle 200 by a disc element 250 which is fixed to the shaft 240 of the valve needle on a side of the armature 300 opposite from the retainer element 230. In other words, the armature 300 has an axial play relative to the valve needle 200 which is limited by the retainer element 230 on one side and by the disc element 250 on the other side. It is also conceivable that the disc element 250 is in one piece with the shaft 240 instead of being fixed thereto, in particular when the retainer element 230 is not in one piece with the shaft 240.

When the valve needle 200 is in the closing position and the coil 55 is activated, the armature 300 is attracted towards the pole piece 50 and moves in axial direction towards the pole piece 50. It is in form-fit engagement with the retainer element 230 so that it takes the valve needle 200 with it in direction away from the closing position—in the present embodiment in direction towards the fluid inlet end 120—against the bias of the calibration spring 70.

The sealing element 260 is in sliding mechanical contact with the seat body 135 for axially guiding the downstream end 220 of the valve needle 200. The upstream end 210 of the valve needle 200 may be axially guided by mechanical interaction between the retainer element 230 and the pole piece 50 or by mechanical interaction of the shaft 240 with the armature 300 which may in turn in sliding mechanical contact with the valve body 100 for axially guiding the armature 300.

In some embodiments, the seat body 135 is a one-pieced metal part which extends from the main body of the valve body 100 in radial inward direction so that it is in direct mechanical contact with the sealing element 260 for establishing the sliding mechanical contact. Fluid passages may be provided between the seat body 135 and the sealing element 260, for example by means of axial channels in the seat body 135 and/or by means of flat portions of the sealing element. The channels form regions where the sealing element 260 and the seat body 135 are radially spaced apart from one another so that fluid may axially pass the sealing element 260 through the channels to the valve seat 140.

The cavity 110 has a first portion 112 and a second portion 118. Both, the first portion 112 and the second portion 118 are generally cylindrical in shape and their circumferential side surfaces have the shape of a circular cylinder. The cross sectional area of the first portion 112 may be larger than the cross section area of the second portion 118.

The second portion 118 is positioned downstream of the first portion 112. More specifically, the first portion 112 has a bottom surface 114 which in perforated by an opening 116 from which the second portion 118 starts and extends in axial direction towards the fluid outlet end 130. In some embodiments, the bottom surface 114 or at least a portion thereof extends perpendicularly to the longitudinal axis L in radial inward direction towards the opening 116. Thus, the inner circumferential surface of the valve body 100 which defines the cavity 110 has a step. The step comprises the bottom surface 114 and represents an interface between the first portion 112 and the second portion 118 of the cavity 110.

Figure 1C:
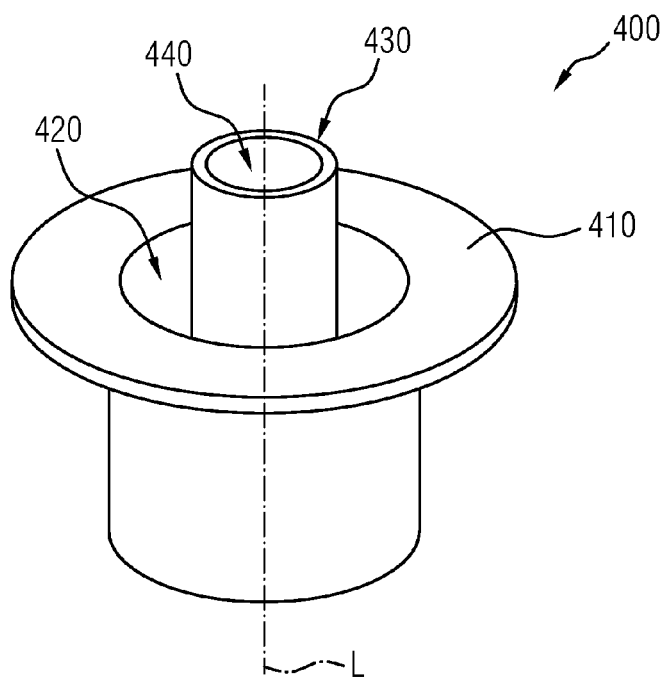
FIG. 1C shows a first perspective view of a particle retainer element of the fluid injection valve according to teachings of the present disclosure.
Figure 1D:
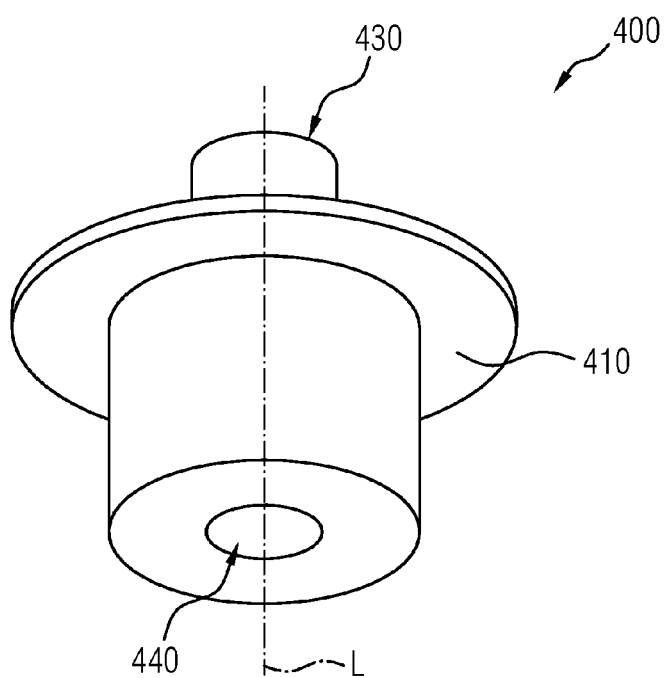
FIG. 1D shows a second perspective view of the particle retainer element according to teachings of the present disclosure.

A particle retainer element 400 is positioned adjacent to the step. An example particle retainer element 400 is shown in the longitudinal section view of FIG. 1B, where lines are omitted which represent edges of the particle retainer element 400 being positioned in viewing direction behind the drawing plane of FIG. 1B. Further, the particle retainer element is shown in two different perspective views in FIG. 1C and FIG. 1D.

The particle retainer element 400 is a one-pieced turned or stamped stainless steel part in the embodiment shown. It has a flange portion 410 which is seated on the bottom surface 114, the bottom surface 114 delimiting the first portion 112 of the cavity 110 in axial direction towards the fluid outlet end 130. At its radial inward edge, the flange portion 410 merges with a trench portion 420 of the particle retainer element 400. The trench portion 420 thus follows flange portion 410 in radial inward direction.

The trench portion 420 has a U-shaped cross section which is open in axial direction towards the fluid inlet end 120 and closed in axial direction towards the fluid outlet end 130. In other words, the trench portion 420 is delimited by side walls in radial inward and outward direction and has a bottom wall which connects the axial ends of the side walls which face towards the fluid outlet end 130. The side walls are preferably in the shape of cylindrical shells and are particularly preferably arranged coaxially to one another and in particular also to the longitudinal axis L.

The outer sidewall of the trench portion 420 extends from the flange portion 410 in axial direction towards the fluid inlet end 130 into the second portion 118 of the cavity 110. It may be in mechanical contact with a circumferential side surface of the second portion 118. In one development, a press-fit connection is established between the outer side wall of the trench portion 420 and the valve body 100.

The inner side wall of the trench portion 420 defines a central aperture 440 of the particle retainer element 400. The inner side wall extends in axial direction towards the fluid inlet end 120 from the second portion 118 of the cavity 110 into the first portion 112 and projects in axial direction towards the fluid inlet end beyond the flange portion 410 to a circumferential inner edge 430 of the inner side wall. The inner edge 430 may be the edge of the inner circumferential side surface of the inner side wall—the circumferential side surface which faces towards the longitudinal axis—which faces towards the fluid inlet end 120. The circumferential inner edge 430 is radially offset with respect to an outer contour of the opening 116 in radial inward direction. It defines an outer contour of the central aperture 440.

The valve needle extends from the first portion 112 of the cavity 110 into the second portion 118 of the cavity through the opening 116 of the bottom surface 114 and through the aperture 240 of the particle retainer element 400. The retainer element 230 and the disc element 250 of the valve needle are positioned within the first portion 112 of the cavity, while the sealing element 260 is positioned in the second portion 118 or downstream of the second portion 118. The armature 300—axially sandwiched between the retainer element 230 and the disc element 250—is also positioned in the first portion 112 of the cavity 110.

In the embodiment shown, the shaft 240 of the valve needle 200 axially overlaps the bottom surface 114, the opening 116 and the particle retainer element 400, while the disc element 250, the retainer element 230, and the sealing element 260 of the valve needle 200, as well as the armature 300, have no axial overlap with the particle retainer element 400, the bottom surface 114 and the opening 116. The sealing element 260 and the seat body 135 are axially spaced apart from (e.g., positioned downstream of) the particle retainer element 400. Thus, the particle retainer element 400 circumferentially surrounds only the shaft 240 of the valve needle 200. The shaft 240 extends axially through the aperture 440.

The fluid injection valve comprises an additional fluid filter 60 which is press-fitted into a central opening of the pole piece 50 and represents spring seat for the calibration spring 70. An axial end of the calibration spring 70 which faces away from the valve needle 200 is seated against the additional fluid filter 60. In the embodiment shown, an axial end of the calibration spring 70 which is in mechanical contact with the valve needle 200 is seated against the retainer element 230.

Fluid is lead through the fluid inlet tube of the valve body 100 into the cavity 110. It flows through the fluid filter 60, further through the central opening of the pole piece 50 and through fluid channels 310 which are comprised by the armature 300. The fluid channels 310 extend obliquely relative to the longitudinal axis L such that their upstream openings are positioned closer to the longitudinal axis L than their downstream openings. In other words, the radial distance of the fluid channels 310 increases in direction from the fluid inlet end 120 towards the fluid outlet end 130. In this way, the fluid channels 310 direct the fluid flow onto an outer edge region 115 of the bottom surface 114 of the first portion 112 of the cavity 110. The outer edge region 115 comprises in particular an interface between the bottom surface 114 and a cylindrical side surface of the first portion 112.

In this way, fluid is forced to flow radially inward along the bottom surface 114 for entering the second portion 118 of the cavity 110 through the opening 116. Due to the circumferential inner edge 430 of the inner wall of the trench portion 420 being axially offset relative to the flange portion 410 towards the fluid inlet end, turbulences are created in the region of the trench portion 220 which may cause particles, which are contained in the fluid stream, to settle in the trench portion while the fluid is flowing over the circumferential inner edge 430 through the aperture 440 of the particle retainer element 400 to the valve seat 140 at the fluid outlet end of the valve body 100.

The trench portion 420 of the particle retainer element 400 overlaps the opening 116 of the bottom surface 114 in top view along the longitudinal axis L. The inner side wall of the trench 420 is laterally spaced apart from the shaft 240 of the valve needle so that the aperture 440 of the particle retainer element 400 completely overlaps the sealing element 260 of the valve needle 200 in top view along the longitudinal axis L. Due to the radial distance between the particle retainer element 400 and the shaft 240 of the valve body, a fluid passage is established, through which fluid can flow from the first portion 112 of the cavity through the aperture 440 of the particle retainer element into the second cavity 118 towards the fluid outlet end 130.

The sealing element 260 has the maximum cross-sectional area of those portions of the valve needle 200 which axially overlap the particle retainer element 400 or are axially offset towards the fluid outlet end 130 relative to the particle retainer element 400 which are located downstream of the circumferential inner edge 430. In this way, the valve needle 200 can be inserted into the valve body and shifted along the longitudinal axis L through the valve body until the sealing element 260 comes in contact with the valve seat 140 while the particle retainer element 400 is already installed in the valve body 100. When shifting the valve needle 200 into the valve body 100, the sealing element passes through the aperture 440 of the particle retainer element 400 in this case.

Figure 2:
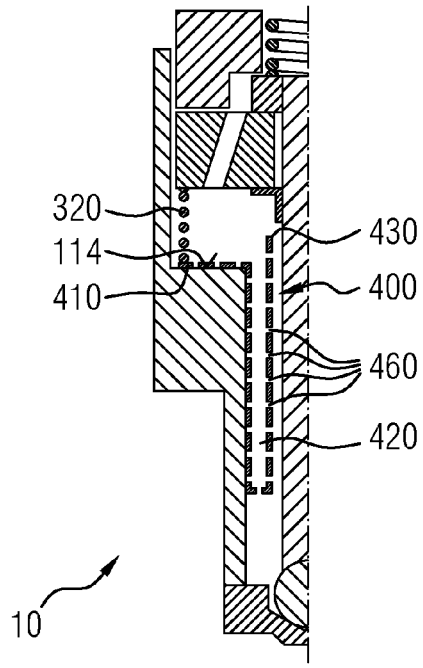
FIGS. 2 to 14 show longitudinal section views of valve assemblies according to teachings of the present disclosure.

FIG. 2 shows an example valve assembly 10 according to teachings of the present disclosure in a schematic longitudinal section view corresponding to that of FIG. 1B. Each of the valve assemblies according to the second embodiment and to the further embodiments below is usable in fluid injection valves 1 as described in connection with the first embodiment, for example.

The valve assembly 10 of FIG. 2 corresponds in general to the valve assembly 10 of FIG. 1. In some embodiments, the particle retainer element 400 has a flange portion 410 which bears on the bottom surface 114 and a trench portion 420 extending through the opening 116 of the bottom surface 114 into the second portion 118 of the cavity 110.

However, the side walls of the trench portion 420, optionally also the bottom wall of the trench portion 420 at its downstream end, and further optionally also the flange portion 410 are provided with a multitude of filtering holes 460 which form a filter sieve for filtering fluid flowing towards the fluid outlet end 130. Each of the filtering holes has a diameter between 20 µm and 30 µm in the present embodiment, the limits being included. With advantage, in case of the valve assembly 10 of the present embodiment, fluid can also flow through the trench portion 420 of the particle retainer element 400 into the second portion 118 of the cavity 110 towards the fluid outlet end 130. In this way, fluid flow properties, such as the laminarity of the fluid flow, and the filtering function of the particle retainer element may be particularly advantageous.

Further, unlike the embodiment of FIG. 1, the flange portion 410 is pressed onto the bottom surface 114 by an armature spring 320 which is positioned in the first portion 112 of the cavity 110. The armature spring is seated against the armature 300 and against the flange portion 410 at its opposite axial ends and is preloaded so that it presses the flange portion 410 against the bottom surface 114 and the armature 300 against the retainer element 230. A press-fit connection between the outer side wall of the trench portion 220 and the valve body 100 is not necessary in the present embodiment.

In the embodiment shown in FIG. 1, the armature spring 320 is seated against the armature 300 at one of its axial ends and directly against the valve body 100—in particular against the bottom surface 114 of the first portion 112 of the cavity 110 at the other axial end. The flange portion 410 is laterally offset in radially inward direction relative to the armature spring 320. However, it is also conceivable that the armature spring 320 is seated against the flange portion 410 for the first embodiment or other embodiments of the present invention.

Figure 3:
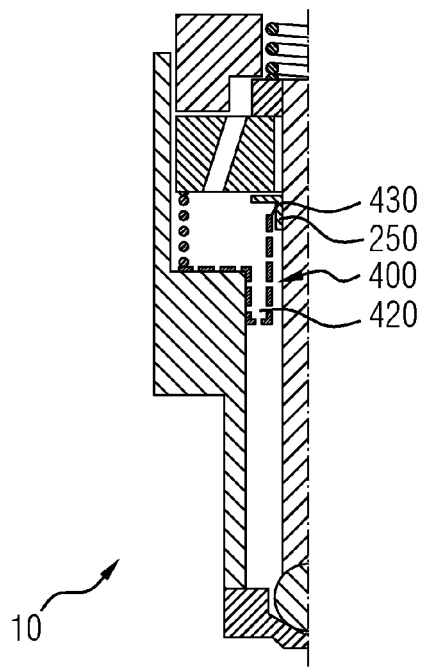

FIG. 3 shows an example valve assembly 10 according to teachings of the present disclosure in a schematic longitudinal section view corresponding to that of FIG. 2.

The example valve assembly 10 shown in FIG. 3 corresponds in general to those previously discussed. However, the axial dimension of the trench portion 420 may be reduced. While the axial dimension of the trench portion 420 in the earlier figures may be at least 50% of the axial dimension of the second portion 118 and in particular at least 50% of the distance between the opening 116 and the valve seat 140, the trench portion 420 of the particle retainer element 400 of FIG. 3 has a value of, for example, between 10% and 20% of the axial dimension of the second portion 118, the limits being included.

However, the circumferential inner edge 430 is axially positioned closer to the fluid inlet end 120 as compared to the earlier embodiments. In particular, the circumferential inner edge 430 of the particle retainer element 400 axially overlaps the disc element 250 which limits the axial displaceability of the armature 300 relative to the valve needle 200. The circumferential inner edge 430 also laterally overlaps the disc element 250 in this embodiment—analogously to the previous embodiments. Due to the lateral and axial overlap in the present embodiment, a particularly large portion of the fluid flow is guided through the filter sieve formed by the filtering holes 460 of the particle retainer element 400.

Figure 4:
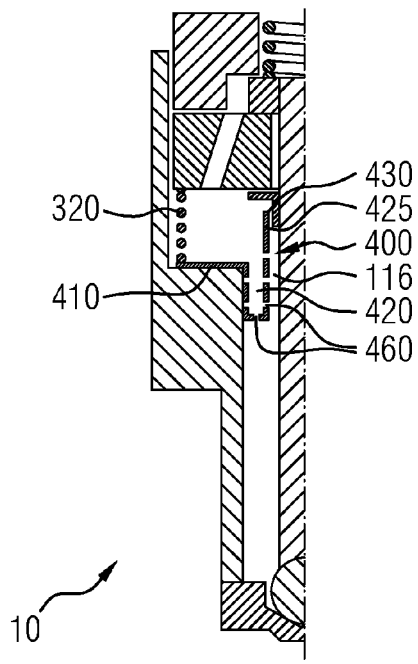

FIG. 4 shows an example valve assembly 10 according to the teachings of the present disclosure in a schematic longitudinal section view, corresponding to that of FIG. 3.

The particle retainer element 400 according to the embodiment shown in FIG. 4 corresponds in general to the earlier embodiments. However, while the particle retainer element 400 of the embodiment shown in FIG. 3 is perforated by filtering holes 460 everywhere, the flange portion 410 and an upper section 425 of the inner wall of the trench portion 420 are unperforated by filtering holes 460.

The upper section 425 of the inner wall comprises the inner circumferential edge 430 and extends downstream from the inner circumferential edge 430 towards the opening 116 of the bottom surface 114. The upper section 425 may be axially offset with respect to the opening 116 towards the fluid inlet end 120 or axially flush with respect to the opening 116.

At least a portion of the inner wall of the trench portion 420 which follows the upper section 425 in direction towards the fluid outlet end 130 is perforated by filtering holes 460 to form a filter sieve. In the present embodiment, also the bottom wall of the trench portion 420 is perforated by filtering holes 460. The outer wall may or may not be perforated by filtering holes 460.

In this way, the fluid stream is particularly well guided through the trench portion 420. Embodiments with this feature make use of the idea that the preferably smooth surface of the unperforated flange portion 410 may lead the fluid particularly well in radial inward direction and/or the unperforated upper section 425 of the inner wall has a particularly large hydraulic resistance and my contribute to deflecting the fluid stream into the trench portion 420.

Figure 5:
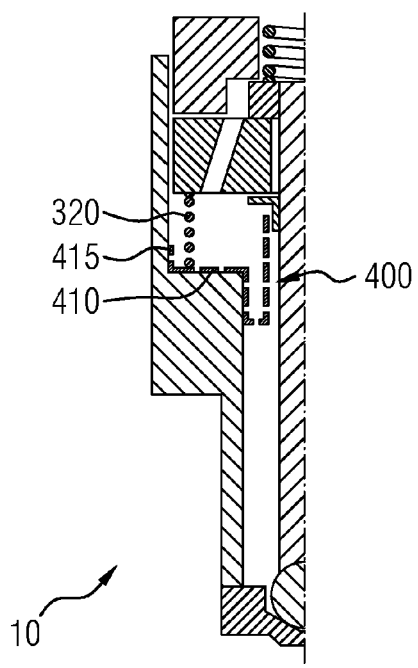

FIG. 5 shows an example valve assembly 10 according to teachings of the present disclosure in a schematic longitudinal section view corresponding in general to that of FIG. 3. However, in contrast to the embodiment of FIG. 3, the particle retainer element 400 has an outer cylindrical side wall 415 which merges with an outer lateral edge of the flange portion 410 from there it extends in axial direction towards the fluid inlet end 120. The armature spring 420 is laterally offset in radial inward direction from the outer cylindrical side wall 415, for example. In one development, a press-fit connection and/or a welded connection is established between the valve body 100 and the outer cylindrical side wall 415.

Figure 6:
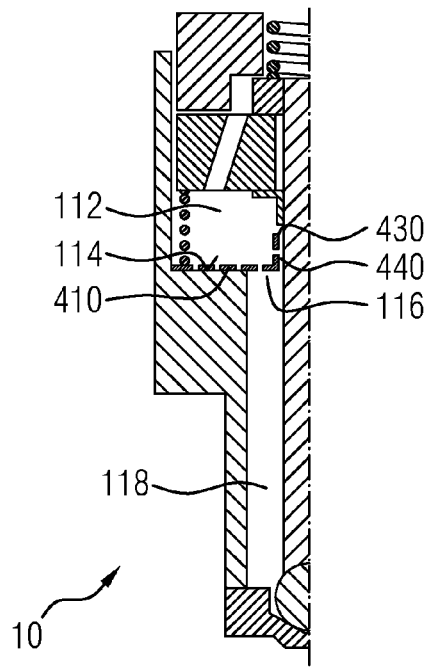

FIG. 6 shows an example valve assembly 10 according to teachings of the present disclosure in a schematic longitudinal section view corresponding in general to that of FIG. 3. In some embodiments, the particle retainer element 400 corresponds in general to that of FIG. 3. In contrast thereto, as shown in FIG. 6, it does not have a trench portion 420 which extends through the opening 116 and a bottom surface 114 into the second portion 118 of the cavity 110. Instead, the particle retainer element 400 has an L-shaped cross section, extending radially inward from the flange portion 410 which bears on the bottom surface 114 and subsequently extends axially towards the fluid inlet end 120 to the circumferential inner edge 430. In the present embodiment, the particle retainer element 400 is positioned within the first portion 112 of the cavity 110 in its entirety and partially covers the opening 116 in the bottom surface 114.

The particle retainer element may consist of a ring-shaped portion comprising the flange portion 410, the ring-shaped portion extending around the longitudinal axis L, being in mechanical contact with the bottom surface 114 and partially overlapping the opening 116. At an inner circumferential edge of the ring portion, a cylindrical inner wall merges with the inner edge and extends in axial direction towards the fluid inlet end 120 to the circumferential inner edge 430 to define the aperture 440.

In the context of this Figure and further Figures discussed below, a "ring-shaped portion" of the particle retainer element 400 refers to a perforated disc shaped portion. A perforated disc includes a cylindrical shell having a height which is smaller than its outer diameter; for example the height is 50% or less, preferably 20% or less, of the outer diameter. The perforated disc may have its central axis parallel or coaxial to the longitudinal axis L. Main surfaces of the perforated disk extend preferably perpendicular to the longitudinal axis and face towards the fluid inlet end 120 and towards the fluid outlet end 130, respectively. The ring-shaped portion may be perforated by filtering holes 460. In this case, the filtering holes 460 preferably extend through the ring-shaped portion in axial direction.

Figure 7:
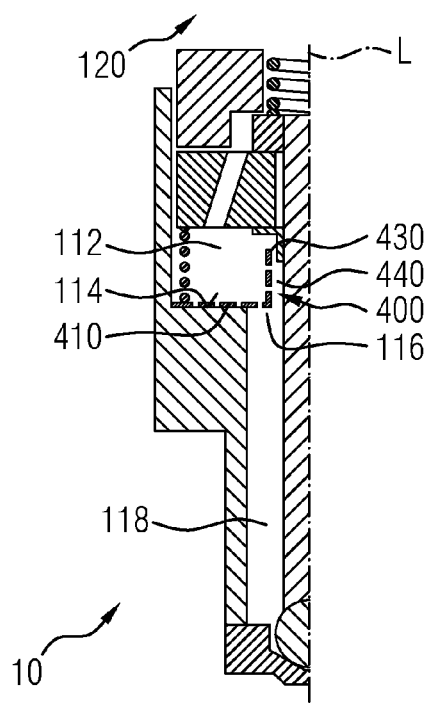

FIG. 7 shows an example valve assembly 10 according to teachings of the present disclosure in a schematic longitudinal section view corresponding to that of FIG. 6. However, the circumferential inner edge 430 is axially offset towards the fluid outlet end 130 relative to the disc element 250 of the valve needle 250 and only laterally overlaps the disc element 250 in FIG. 7—as in FIGS. 1 and 2, for example. In contrast thereto, the circumferential inner edge 430 axially and laterally overlaps the disc element 250 in FIG. 7, similar to FIG. 3.

Figure 8:
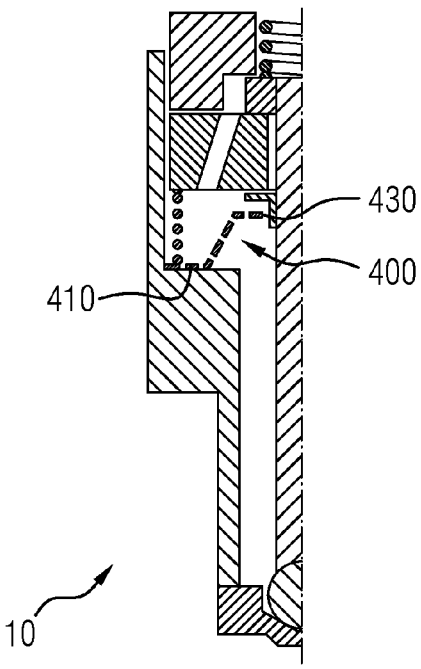

FIG. 8 shows an example valve assembly 10 according to teachings of the present disclosure in a schematic longitudinal section view corresponding to that of FIG. 7. However, instead of an L-shaped cross section, it has two concentric ring-shaped portions which are axially displaced with respect to one another and are connected by a conical portion. Specifically, the flange portion 410 represents a first ring-shaped portion. It is succeeded in radial inward direction by a conical portion. The conical portion tapers from a first edge in axial direction towards the fluid inlet end 120 to a second circumferential edge. At the first edge, the conical portion merges with the flange portion 410. At the second edge, the conical portion merges with a second ring-shaped portion. The second ring-shaped portion follows the conical portion in radial inward direction and extends to the circumferential inner edge 430. The second ring-shaped portion axially and laterally overlaps the disc element 250 of the valve needle 200.

Figure 9:
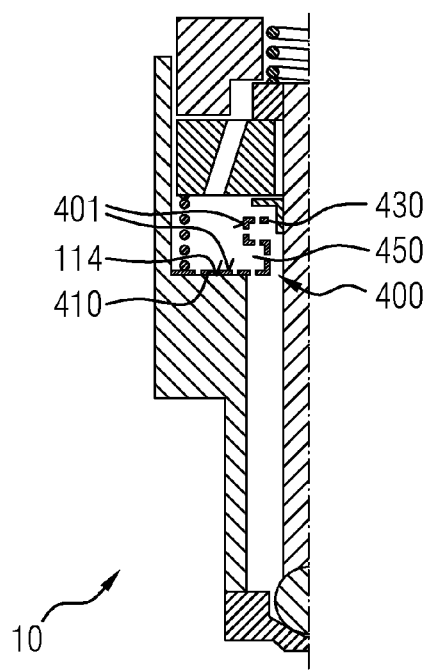

FIG. 9 shows an example valve assembly 10 according to teachings of the present disclosure in a schematic longitudinal section view corresponding to that of FIG. 7. However, instead of having a cylindrical inner wall which defines the aperture 440, the inner wall is shaped to form two axially subsequent pockets. To this end, it has an S-shaped or Z-shaped cross section, for example. Specifically, an upstream surface 401 of the particle retainer element 400 extends, in the course from the flange portion 410 to the circumferential inner edge 430, in radial inward direction, subsequently in axial direction towards the fluid inlet end 120 and subsequently in radial outward direction so as to form a first circumferential pocket 450 for accommodating particles.

In the embodiment of FIG. 9, the first circumferential pocket 450 is formed by a first ring-shaped portion, a first cylindrical wall portion, and a second ring-shaped portion of the particle retainer element 400. The first ring-shaped portion comprises the flange portion 410 and extends radially inwards so as to cover the opening 116 partially. The first cylindrical wall portion merges with the first ring-shaped portion at one axial end and merges with an inner circumferential end of the second ring-shaped portion at the opposite axial end. The second ring-shaped portion extends radially outward from its inner circumferential end so that it laterally overlaps the first ring-shaped portion.

In this embodiment, the particle retainer element further comprises a second cylindrical wall portion, merging with an outer lateral edge of the second ring-shaped portion at one axial end and with the outer lateral edge of a third ring-shaped portion at its opposite axial end. The third ring-shaped portion comprises the circumferential inner edge on its lateral side remote from the outer lateral edge. By means of the second and third ring-shaped portions and the second cylindrical wall portion, a second circumferential pocket is formed in the particle retainer element 400 which is open at its side facing towards the longitudinal axis L.

All central axes of the ring-shaped portions and the cylindrical wall portions are preferably coaxial to the longitudinal axes. The third ring-shaped portion axially and laterally overlaps the disc element 250 of the valve needle 200. In addition, the second cylindrical wall portion overlaps the disc element 250 at least axially.

Figure 10:
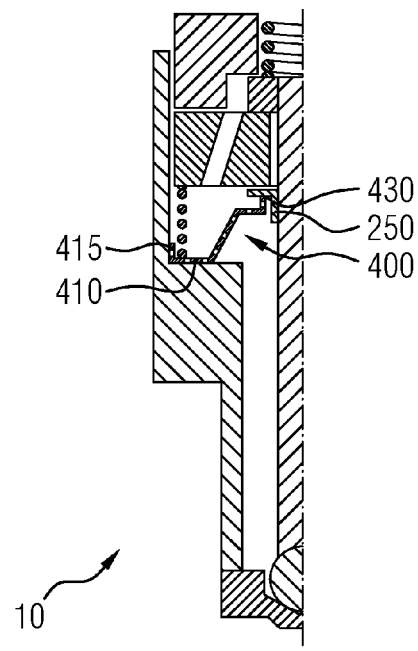

FIG. 10 shows an example valve assembly 10 according to teachings of the present disclosure in a schematic longitudinal section view corresponding in general to that of FIG. 8. However, in the present embodiment, the particle retainer element 400 is in direct mechanical contact with the disc element 250 of the valve needle 200.

In the embodiment shown, the particle retainer element 400 has a first ring-shaped portion comprising the flange portion 410, a conical portion and a second ring-shaped portion as described above in connection with the eighth embodiment. In addition, however, the particle retainer element 400 has a cylindrical wall portion merging with an inner circumferential edge of the second ring-shaped portion and extending in axial direction towards the fluid inlet end 120 from said edge to the disc element 250 where it comprises the circumferential inner edge 430 of the particle retainer element 400. The cylindrical wall portion, in particular the circumferential inner edge 430, contacts a surface of the disc element 250 of the valve needle 200 which surface faces towards the fluid outlet end 130.

In this embodiment, the particle retainer element 400 also has an outer cylindrical sidewall 415 as described above in connection with FIG. 5.

Figure 11:
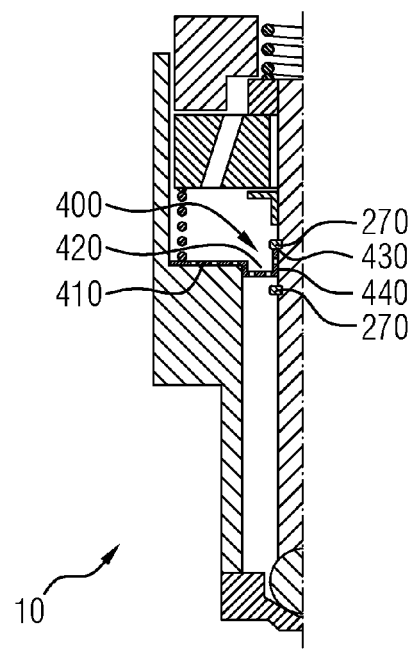

FIG. 11 shows an example valve assembly 10 according to teachings of the present disclosure in a schematic longitudinal section view corresponding to that of FIG. 3. However, in FIG. 11 the particle retainer element 400 is not laterally spaced apart from the shaft 240 of the valve needle 200. Rather, the trench portion 420 bridges the entire radial clearance between the valve body 100 and the shaft 240. The circumferential inner wall of the trench 420 which comprises the circumferential inner edge 430 of the particle retainer element 400 is in direct mechanical contact with the shaft 240 of the valve needle 200. More specifically, the inner wall of the trench portion 420 is in sliding mechanical contact with the shaft 240 and the particle retainer element 400 has an axial play relative to the valve needle 200.

Axial displaceability of the particle retainer element 400 relative to the valve needle 200 is limited in the present embodiments by locking elements 270, such as circlips, snap rings, or the like. The locking element 270 are positioned axially subsequent to the inner wall of the trench portion 420 in axial direction towards the fluid inlet end 120 and towards the fluid outlet end 130. The locking elements 270 are positionally fixed relative to the shaft 240 of the valve needle. For example, they are in form-fit end and/or force-fit engagement with respective grooves in the shaft 240. In this way, axial displaceability of the inner wall and, thus, of the circumferential inner edge 430 relative to the shaft 240 is limited.

The particle retainer element 400 may engage in form-fit connection with the locking elements 270. In this way, axial displacement of the particle retainer element 400 relative to the valve needle 200 can be limited before and during inserting the valve needle 200 into the valve body 100 together with the particle retainer element 400 when assembling the valve assembly 10.

During operation of the valve assembly 10, the inner wall of the trench portion 420 is preferably spaced apart from the locking elements 270 when the valve needle 200 is in the closing position as well as in a fully open configuration of the valve assembly 10 in which the armature 300 and/or the retainer element 230 are preferably in form-fit connection with the valve body 100 or the pole piece 50. To hold the particle retainer element 400 in place, the flange portion 410 of the particle retainer element 400 is pressed against the bottom surface 114 which delimits the first portion 112 of the cavity 110 by means of the armature spring 320 as described above, e.g. in connection with the third embodiment.

Figure 12:
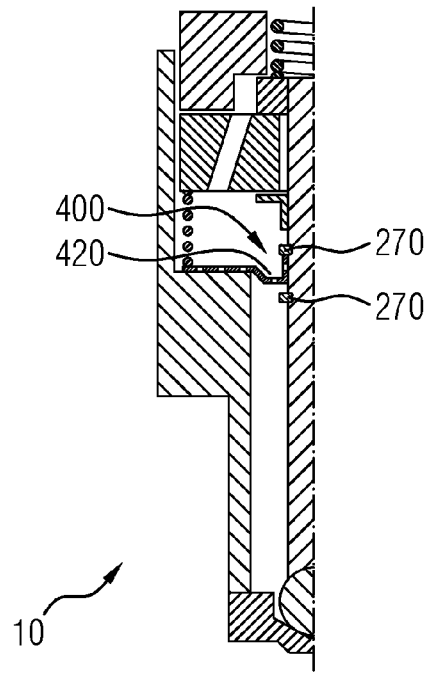

FIG. 12 shows an example valve assembly 10 according to teachings of the present disclosure in a schematic longitudinal section view corresponding to that of FIG. 11. In contrast thereto, the trench portion 420 has an outer circumferential side wall which is not cylindrical in shape but tapers conically in axial direction towards the fluid outlet end 130.

Figure 13:
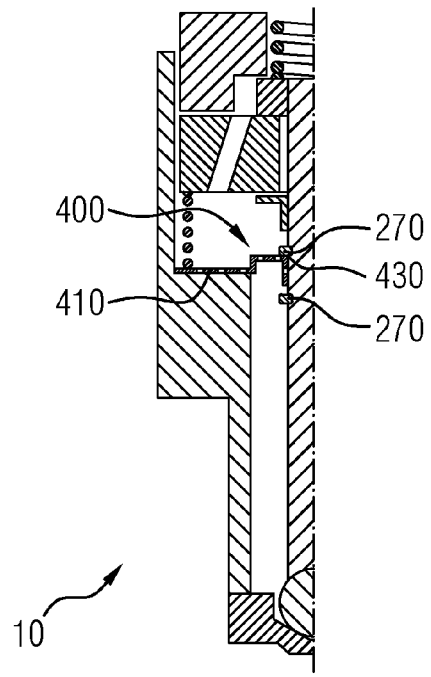

FIG. 13 shows an example valve assembly 10 according to teachings of the present disclosure in a schematic longitudinal section view corresponding to that of FIG. 11. However, the particle retainer element 400 of FIG. 13 does not have a trench portion 420 which extends in axial direction towards the fluid outlet end 130 into the second portion 118 of the cavity 110. Instead, the flange portion 410 is followed in radial inward direction by a cylindrical wall portion which extends from the bottom surface 114 in axial direction towards the fluid inlet end 120 into the first portion 112 and is followed in radial inward direction by a ring-shaped portion which bridges the opening 116 and extends in radial inward direction to the shaft 240 of the valve needle where it comprises the circumferential inner edge 430. A circumferential inner wall extends in axial direction towards the fluid outlet end 130 from the circumferential inner edge 430 and is positioned axially between two locking elements 270 as in the eleventh embodiment. In this way, the installation of the valve needle 200, preassembled with the particle retainer element 400, into the valve body 100 is particularly simple and does in particular not require shifting the trench portion 420 of the particle retainer element 400 into the second portion 118 of the cavity 110 through the opening 116.

Figure 14:
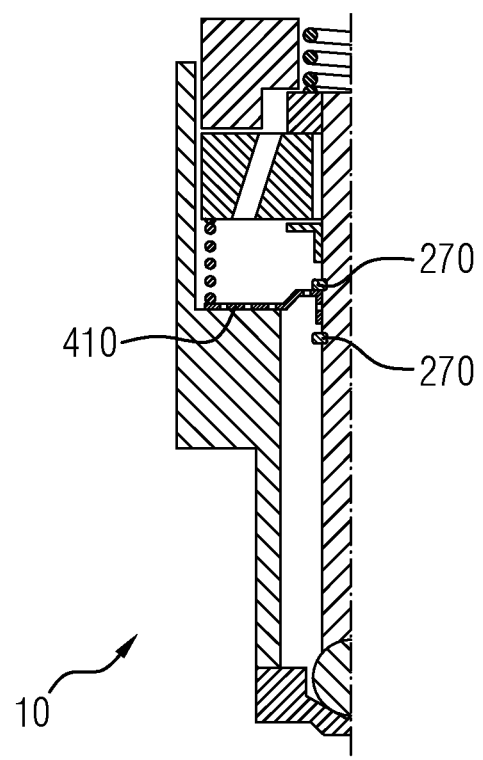

FIG. 14 shows an example valve assembly 10 according to teachings of the present disclosure in a schematic longitudinal section view corresponding to that of FIG. 13. In contrast thereto, the particle retainer element 400 has a conical portion instead of the cylindrical wall portion between the flange portion 410 and the ring-shaped portion. The conical portion tapers in axial direction towards the fluid inlet end 120.

The invention is not limited to specific embodiments by the description on basis of these exemplary embodiments. Rather, it comprises any combination of elements of different embodiments. Moreover, the invention comprises any combination of claims and any combination of features disclosed by the claims.

The invention claimed is:
1. A valve assembly for a fluid injection valve, the valve assembly comprising:
   a valve body having a longitudinal axis and a cavity which extends axially through the valve body for hydraulically connecting a fluid inlet end to a fluid outlet end of the valve body, and having a valve seat adjacent to the fluid outlet end;
   a valve needle movable in the cavity and in contact with the valve seat in a closing position of the valve needle; and
   an armature disposed in a first portion of the cavity for displacing the valve needle axially away from the closing position,
   wherein the first portion of the cavity limits movement of the armature in the axial direction towards the fluid outlet end by a bottom surface,
   wherein the bottom surface has a central opening from which a second portion of the cavity extends towards the fluid outlet end;
   wherein a shaft of the valve needle extends through the central opening into the second portion of the cavity: and
   a particle retainer element fit in the cavity in fixed contact with the bottom surface, circumferentially surrounding the shaft of the valve needle and at least partially overlapping the central opening in the axial direction;
   wherein the particle retainer element includes:
   (a) a flange portion coupled to the bottom surface; and
   (b) a circumferential inner edge radially offset from the flange portion in a radial inward direction and defining a central aperture of the particle retainer element through which the shaft of the valve needle extends, wherein the circumferential inner edge is positioned in the first portion of the cavity and is axially offset towards the fluid inlet end relative to the bottom surface and the flange portion.

2. A valve assembly according to claim 1, further comprising fluid channels operable to guide fluid towards an outer edge region of the bottom surface,
   the fluid channels are either defined by the armature and extending obliquely to the longitudinal axis or formed between an outer circumferential surface of the armature and the valve body.

3. A valve assembly according to claim 1, wherein the particle retainer element further comprises a trench portion for accommodating particles, wherein the trench portion follows the flange portion in a radial inward direction and extends axially into the second portion of the cavity.

4. A valve assembly according to claim 1, wherein an upstream surface of the particle retainer element extends, in the course from the flange portion to the circumferential inner edge, in a radial inward direction, subsequently in an axial direction towards the fluid inlet end, and subsequently in a radial outward direction so as to form a circumferential pocket for accommodating particles.

5. A valve assembly according to claim 1, wherein the cross-sectional area of the aperture is larger than a maximum cross-sectional area of that portion of the valve needle which is positioned downstream of the circumferential inner edge.

6. A valve assembly according to claim 1, wherein the circumferential inner edge is in mechanical contact with the shaft of the valve needle or with a disc element of the valve needle which extends circumferentially around the shaft.

7. A valve assembly according to claim 6, wherein the particle retainer element makes a form-fit connection with the valve needle for limiting axial displacement of the circumferential inner edge relative to the shaft.

8. A valve assembly according to claim 1, further comprising an armature spring seated against the armature and against the particle retainer element at opposite axial ends and which is preloaded to press the particle retainer element in contact with the bottom surface.

9. A valve assembly according to claim 1, wherein the particle retainer element comprises a one-piece, metal part.

10. A valve assembly according to claim 1, wherein the particle retainer element includes a multitude of filtering holes, each having a diameter of 100 μm or less, the multitude of filtering holes together forming a filter sieve.

11. A fluid injection valve according to claim 1, wherein:
   the valve body comprises a seat body including the valve seat and is a one-pieced part, and
   the valve needle comprises a sealing element in mechanical contact with the valve seat in the closing position of the valve needle, the sealing element being in sliding mechanical contact with the seat body for axially guiding the valve needle.

12. A fluid injection valve according to claim 11, wherein the sealing element fixed to a downstream end of the shaft and the particle retainer element have no axial overlap.

13. A fluid injection valve comprising:
   a valve body having a longitudinal axis and a cavity which extends axially through the valve body for hydraulically connecting a fluid inlet end to a fluid outlet end of the valve body, and having a valve seat adjacent to the fluid outlet end;

a valve needle movable in the cavity and in contact with the valve seat in a closing position of the valve needle; and an armature disposed in a first portion of the cavity for displacing the valve needle axially away from the closing position, wherein the first portion of the cavity limits movement of the armature in the axial direction towards the fluid outlet end by a bottom surface, wherein the bottom surface has a central opening from which a second portion of the cavity extends towards the fluid outlet end;

wherein a shaft of the valve needle extends through the central opening into the second portion of the cavity;

a particle retainer element fit in the cavity in fixed contact with the bottom surface, circumferentially surrounding the shaft of the valve needle and at least partially overlapping the central opening in the axial direction;

wherein the particle retainer element includes:

(a) a flange portion coupled to the bottom surface; and (b) a circumferential inner edge radially offset from the flange portion in a radial inward direction and defining a central aperture of the particle retainer element through which the shaft of the valve needle extends, wherein the circumferential inner edge is axially offset towards the fluid inlet end relative to the bottom surface and the flange portion; and an additional fluid filter upstream of the armature.

14. A fluid injection valve comprising:

a valve body having a longitudinal axis and a cavity which extends axially through the valve body for hydraulically connecting a fluid inlet end to a fluid outlet end of the valve body, and having a valve seat adjacent to the fluid outlet end;

a valve needle movable in the cavity and in contact with the valve seat in a closing position of the valve needle; and an armature disposed in a first portion of the cavity for displacing the valve needle axially away from the closing position;

wherein the first portion has a bottom surface having a central opening from which a second portion of the cavity extends towards the fluid outlet end;

wherein a shaft of the valve needle extends through the central opening into the second portion of the cavity; and a particle retainer element arranged in the cavity, the particle retainer element circumferentially surrounding the shaft of the valve needle and including:

(a) a flange portion bearing on the bottom surface of the first portion of the cavity; and (b) a circumferential inner edge radially offset from the flange portion in a radial inward direction and defining a central aperture of the particle retainer element through which the shaft of the valve needle extends, wherein the circumferential inner edge is axially offset towards the fluid inlet end relative to the bottom surface and the flange portion.

* * * * *